US012619835B2

(12) United States Patent　　　　　(10) Patent No.: US 12,619,835 B2
Galle et al.　　　　　　　　　　　　　(45) Date of Patent: May 5, 2026

(54) ADAPTERS FOR ZERO-SHOT MULTILINGUAL NEURAL MACHINE TRANSLATION

(71) Applicant: Naver Corporation, Gyeonggi-do (KR)

(72) Inventors: Matthias Galle, Eybens (FR);
　　　　　　Alexandre Berard, Grenoble (FR);
　　　　　　Laurent Besacier, Seyssinet Pariset
　　　　　　(FR); Jerin Philip, Kannur (IN)

(73) Assignee: NAVER CORPORATION,
　　　　　　Seongnam-Si (KR)

( * ) Notice: Subject to any disclaimer, the term of this
　　　　　　patent is extended or adjusted under 35
　　　　　　U.S.C. 154(b) by 1153 days.

(21) Appl. No.: 17/521,204

(22) Filed: Nov. 8, 2021

(65) Prior Publication Data

US 2022/0147721 A1　　　May 12, 2022

Related U.S. Application Data

(60) Provisional application No. 63/253,698, filed on Oct.
8, 2021, provisional application No. 63/111,863, filed
on Nov. 10, 2020.

(51) Int. Cl.
　　G06F 40/58　　　　(2020.01)
　　G06N 3/04　　　　(2023.01)
　　G06N 3/08　　　　(2023.01)

(52) U.S. Cl.
　　CPC .............. G06F 40/58 (2020.01); G06N 3/04
　　　　　　(2013.01); G06N 3/08 (2013.01)

(58) Field of Classification Search
　　CPC ...... G06F 40/58; G06F 40/216; G06F 40/284;
　　　　　　G06F 40/30; G06F 40/44; G06N 3/04;
　　　　　　G06N 3/08; G06N 3/045
　　See application file for complete search history.

(56) References Cited

U.S. PATENT DOCUMENTS 10,452,978 B2　　10/2019　Shazeer et al.
2020/0380215 A1*　12/2020　Kannan ................. G10L 15/005

OTHER PUBLICATIONS

Guo et al. "Incorporating bert into parallel sequence decoding with
adapters." Advances in Neural Information Processing Systems 33,
p. 10843-10854 (Year: 2020).*

(Continued)

*Primary Examiner* — KC Chen
(74) *Attorney, Agent, or Firm* — Greer, Burns & Crain,
Ltd.

(57)　　　　　　ABSTRACT
Multilingual neural machine translation systems having
monolingual adapter layers and bilingual adapter layers for
zero-shot translation include an encoder configured for
encoding an input sentence in a source language into an
encoder representation and a decoder configured for pro-
cessing output of the encoder adapter layer to generate a
decoder representation. The encoder includes an encoder
adapter selector for selecting, from a plurality of encoder
adapter layers, an encoder adapter layer for the source
language to process the encoder representation. The decoder
includes a decoder adapter selector for selecting, from a
plurality of decoder adapter layers, a decoder adapter layer
for a target language for generating a translated sentence of
the input sentence in the target language from the decoder
representation.

19 Claims, 8 Drawing Sheets

(56) References Cited

OTHER PUBLICATIONS

Aharoni, R., et al., "Massively Multilingual Neural Machine Translation," Proceedings of the 2019 Conference of the North, Minneapolis, Minnesota, Association for Computational Linguistics, 2019, pp. 3874-3884.

Anastasopoulas, A., et al., "Should All Cross-Lingual Embeddings Speak English?" published on ArXiv org as 1911.03058, Nov. 8, 2019, 22 pages.

Arivazhagen, N., et al., "Massively Multilingual Neural Machine Translation in the Wild: Findings and Challenges," published on ArXiv org as:1907.05019, Jul. 11, 2019, 27 pages.

Artetxe, M., et al., "On the Cross-Lingual Transferability of Monolingual Representations," Proceedings of the 58th Annual Meeting of the Association for Computational Linguistics, Online: Association for Computational Linguistics, Jul. 5-10, 2020, pp. 4623-4637.

Bañón, M., et al., "ParaCrawl: Web-Scale Acquisition of Parallel Corpora," Proceedings of the 58th Annual Meeting of the Association for Computational Linguistics, Online: Association for Computational Linguistics, Jul. 5-10, 2020, pp. 4555-4567.

Bapna, A., et al., "Simple, Scalable Adaptation for Neural Machine Translation," Proceedings of the 2019 Conference on Empirical Methods in Natural Language Processing and the 9th International Joint Conference on Natural Language Processing (EMNLP-IJCNLP), Hong Kong, China: Association for Computational Linguistics, Nov. 3-7, 2019, pp. 1538-1548.

Berard, A., "Continual Learning in Multilingual NMT via Language-Specific Embeddings," published on arXiv as 2110.10478, Oct. 20, 2021, 24 pages.

Berard, A., et al., "Naver Labs Europe's Systems for the WMT19 Machine Translation Robustness Task," Proceedings of the Fourth Conference on Machine Translation (vol. 2: Shared Task Papers, Day 1), Florence, Italy, Association for Computational Linguistics, Aug. 1-2, 2019, pp. 526-532.

Berard, A., et al., "Efficient Inference for Multilingual Neural Machine Translation," published on arXiv as 2109.06679, Sep. 14, 2021, 20 pages.

Dabre, R., et al., "A Comprehensive Survey of Multilingual Neural Machine Translation," published on ArXiv org as 2001.01115, Jan. 7, 2020, 34 pages.

Escolano, C., et al., "Multilingual Machine Translation: Closing the Gap between Shared and Language-Specific Encoder-Decoders," published on ArXiv org as 2004.06575, Apr. 14, 2020, 5 pages.

Escolano, C., et al., "From Bilingual to Multilingual Neural Machine Translation by Incremental Training," Proceedings of the 57th Annual Meeting of the Association for Computational Linguistics: Student Research Workshop, Florence, Italy, Association for Computational Linguistics, Jul. 28-Aug. 2, 2019, pp. 236-242.

Escolano, C., et al., "Training Multilingual Machine Translation by Alternately Freezing Language-Specific Encoders-Decoders," published on arXiv:2006.01594v1, May 29, 2020, 10 pages.

Fan, A., et al., "Beyond English-Centric Multilingual Machine Translation," published on arXiv:2010.11125v1, Oct. 21, 2020, 38 pages.

Firat, O., et al., "Multi-Way, Multilingual Neural Machine Translation with a Shared Attention Mechanism," Proceedings of the 2016 Conference of the North American Chapter of the Association for Computational Linguistics: Human Language Technologies, San Diego, California: Association for Computational Linguistics, Jun. 12-17, 2016, pp. 866-875.

Freitag, M., et al., "Complete Multilingual Neural Machine Translation," Proceedings of the Fifth Conference on Machine Translation, Nov. 19-20, 2020, pp. 550-560.

Garcia, X., et al., "Towards Continual Learning for Multilingual Machine Translation via Vocabulary Substitution," Proceedings of the 2021 Conference of the North American Chapter of the Association for Computational Linguistics: Human Language Technologies, Online: Association for Computational Linguistics, Jun. 6-11, 2021, pp. 1184-1192.

Houlsby, N., et al., "Parameter-Efficient Transfer Learning for NLP," International Conference on Machine Learning, 2019, pp. 2790-2799.

Johnson, M., et al., "Google's Multilingual Neural Machine Translation System: Enabling Zero-Shot Translation," published on ArXiv org as 1611.04558, Nov. 14, 2016, 16 pages.

Kingma, D., et al., "Adam: A Method for Stochastic Optimization," published on arXiv:1412.6980v7, Jul. 20, 2015, 13 pages.

Kudugunta, S., et al., "Investigating Multilingual NMT Representations at Scale," Proceedings of the 2019 Conference on Empirical Methods in Natural Language Processing and the 9th International Joint Conference on Natural Language Processing (EMNLP-IJCNLP), Hong Kong, China: Association for Computational Linguistics, Nov. 3-7, 2019, pp. 1565-1575.

Lakew, S., et al., "Adapting Multilingual Neural Machine Translation to Unseen Languages," published on arXiv:1910.13998v1, Oct. 30, 2019, 9 pages.

Lui, M., et al., "langid.py: An Off-the-shelf Language Identification Tool," Proceedings of the ACL 2012 System Demonstrations, Jeju Island, Korea, Jul. 8-14, 2021, pp. 25-30.

Lyu, S., et al., "Revisiting Modularized Multilingual NMT to Meet Industrial Demands," Proceedings of the 2020 Conference on Empirical Methods in Natural Language Processing (EMNLP), Online: Association for Computational Linguistics, Nov. 16-20, 2020, pp. 5905-5918.

Neubig, G., et al., "Rapid Adaptation of Neural Machine Translation to New Languages," published on ArXiv org as 1808.04189, Aug. 13, 2018, 6 pages.

Ott, M., et al., "Fairseq: A Fast, Extensible Toolkit for Sequence Modeling," published on ArXiv org as 1904.01038, Apr. 1, 2019, 6 pages.

Ott, M., et al., "Scaling Neural Machine Translation," Proceedings of the Third Conference on Machine Translation: Research Papers, Belgium, Brussels: Association for Computational Linguistics, Oct. 31-Nov. 1, 2018, 9 pages.

Pfeiffer, J., et al., "AdapterHub: A Framework for Adapting Transformers," Proceedings of the 2020 Conference on Empirical Methods in Natural Language Processing: System Demonstrations, Online: Association for Computational Linguistics, 2020, pp. 46-54.

Pfeiffer, J., et al., "Mad-X: An Adapter-Based Framework for Multi-Task Cross-Lingual Transfer," Proceedings of the 2020 Conference on Empirical Methods in Natural Language Processing (EMNLP), Online: Association for Computational Linguistics, 2020, pp. 7654-7673.

Pfeiffer, J., et al., "UNKs Everywhere: Adapting Multilingual Language Models to New Scripts," published on arXiv:2012.15562v1, Dec. 31, 2020, 19 pages.

Philip, J., et al., "Monolingual Adapters for Zero-Shot Neural Machine Translation," Proceedings of the 2020 Conference on Empirical Methods in Natural Language Processing (EMNLP), Online: Association for Computational Linguistics, Nov. 16-20, 2020, pp. 4465-4470.

Qi, Y., et al., "When and Why Are Pre-trained Word Embeddings Useful for Neural Machine Translation?" Proceedings of the 2018 Conference of the North American Chapter of the Association for Computational Linguistics: Human Language Technologies, vol. 2 (Short Papers), New Orleans, Louisiana: Association for Computational Linguistics, Jun. 1-6, 2018, 529-535.

Rebuffi, S., et al., "Learning Multiple Visual Domains with Residual Adapters," 31st Conference on Neural Information Processing Systems (NIPS 2017), Long Beach, CA, USA, 2017, 11 pages.

Rebuffi, S., et al., "Efficient Parametrization of Multi-Domain Deep Neural Networks," 2018 IEEE/CVF Conference on Computer Vision and Pattern Recognition, Salt Lake City, UT: IEEE, 2018, pp. 8119-8127.

Reimers, N., et al., "Making Monolingual Sentence Embeddings Multilingual Using Knowledge Distillation," Proceedings of the 2020 Conference on Empirical Methods in Natural Language Processing (EMNLP), Online: Association for Computational Linguistics, Nov. 16-20, 2020, pp. 4512-4525.

Sennrich, R., et al., "Neural Machine Translation of Rare Words with Subword Units," Proceedings of the 54th Annual Meeting of

(56) References Cited

OTHER PUBLICATIONS the Association for Computational Linguistics (vol. 1: Long Papers), Berlin, Germany: Association for Computational Linguistics, Aug. 7-12, 2016, pp. 1715-1725.

Stickland, A., et al., "Recipes for Adapting Pre-trained Monolingual and Multilingual Models to Machine Translation," published on arXiv:2004.14911v1, Apr. 30, 2020, 13 pages.

Tan, X., et al., "Multilingual Neural Machine Translation with Knowledge Distillation," published on ArXiv org as 1902.10461v3, Apr. 30, 2019, 14 pages.

Thompson, B., et al., "Freezing Subnetworks to Analyze Domain Adaptation in Neural Machine Translation," Proceedings of the Third Conference on Machine Translation: Research Papers, Belgium, Brussels: Association for Computational Linguistics, Oct. 31-Nov. 1, 2018, pp. 124-132.

Üstün, A., et al., "Multilingual Unsupervised Neural Machine Translation with Denoising Adapters," Proceedings of the 2021 Conference on Empirical Methods in Natural Language Processing, Online and Punta Cana, Dominican Republic: Association for Computational Linguistics, Nov. 7-11, 2021, pp. 6650-6662.

Üstün, A., et al., "UDapter: Language Adaptation for Truly Universal Dependency Parsing," published on arXiv:2004.14327v1, Apr. 29, 2020, 14 pages.

Variš, D., et al., "Unsupervised Pretraining for Neural Machine Translation Using Elastic Weight Consolidation," Proceedings of the 57th Annual Meeting of the Association for Computational Linguistics: Student Research Workshop, Florence, Italy: Association for Computational Linguistics, Jul. 28-Aug. 2, 2019, pp. 130-135.

Vaswani, A., et al., "Attention Is All You Need," 31st Conference on Neural Information Processing Systems (NIPS 2017), Long Beach, CA, USA, 2017, pp. 5998-6008.

Zhang, B., et al., "Improving Massively Multilingual Neural Machine Translation and Zero-Shot Translation," published on ArXiv org as 2004.11867v1, Apr. 24, 2020, 13 pages.

Ziemski, M., et al., "The United Nations Parallel Corpus v1.0," Proceedings of the Tenth International Conference on Language Resources and Evaluation (LREC'16), Portorož, Slovenia, 2016, pp. 3530-3534.

Ba, J., et al., "Layer Normalization," published on arXiv: 1607.06450v1, Jul. 21, 2016, 14 pages.

* cited by examiner

ADAPTERS FOR ZERO-SHOT MULTILINGUAL NEURAL MACHINE TRANSLATION

PRIORITY INFORMATION

The present application claims priority, under 35 USC § 119(e), from U.S. Provisional Patent Application, Ser. No. 63/111,863, filed on Nov. 10, 2020. The entire content of U.S. Provisional Patent Application, Ser. No. 63/111,863, filed on Nov. 10, 2020, is hereby incorporated by reference.

The present application claims priority, under 35 USC § 119(e), from U.S. Provisional Patent Application, Ser. No. 63/253,698, filed on Oct. 8, 2021. The entire content of U.S. Provisional Patent Application, Ser. No. 63/253,698, filed on Oct. 8, 2021, is hereby incorporated by reference.

FIELD

The present disclosure relates to multilingual neural machine translation.

BACKGROUND

Multilingual neural machine translation (MNMT) for generating translations across a large number of languages has progressed. A feature offered by methods of MNMT is that translation quality can be improved for languages that lack sufficient training data. In the extreme case of zero-shot translation, MNMT systems translate between a language-pair that has not been seen at training time. While performance in the low resource setting has increased over the past years, zero-shot performance of known MNMT systems remains low.

For known MNMT systems, it has been observed that zero-shot performance increases with the number of considered languages for which the system is trained. However, with increasing number of considered languages, these systems increasingly suffer from insufficient modelling capacity and generate artifacts such as off-target translation. Some solutions that address this problem propose using language-aware normalization. Other solutions propose using back translation to improve quality of zero-shot translation.

Adapting conventional artificial neural networks for a new task, such as translations involving a new language that has not been used in previous training, requires retraining the whole artificial neural network yielding another set of parameters that must be stored. To address the problem of increase in model size in multi-task settings, adapter modules have been proposed, where an MNMT system with lightweight adapter layers are transplanted between the layers of a pre-trained parent artificial neural network. In this approach, the parameters of the parent MNMT system remain fixed, so that the final multilingual model is only insignificantly larger than the parent MNMT model. In addition, in this approach, adapter layers are trained pairwise for translation from a particular source language to a particular target language. Such an MNMT system has been shown to mitigate the problem of performance drop in higher resource languages. In other solutions, plug-and-play encoders and decoders have been proposed that require considerably larger model sizes.

There continues therefore to be a need for an improved MNMT system that addresses these and other problems.

SUMMARY

In the present disclosure, a parameter-efficient artificial neural network for multilingual machine translation (MNMT) is set forth that allows to translate from any source language to any target languages seen in the training data regardless of whether the system has been trained for the specific language direction. In addition, in the present disclosure, there is provided a method for adding new source or target languages without having to retrain on the initial set of languages used to train the MNMT system.

In a feature, a multilingual neural machine translation system for translating an input sequence from a source language to a target language, includes: an encoder configured for encoding the input sequence in the source language into an encoder representation, wherein the encoder includes an encoder adapter selector for selecting, from a plurality of encoder adapter layers, an encoder adapter layer corresponding to the source language for processing the encoder representation; and a decoder configured for processing output of the encoder adapter layer to generate a decoder representation, wherein the decoder includes a decoder adapter selector for selecting, from a plurality of decoder adapter layers, a decoder adapter layer corresponding to the target language for generating a translation of the input sequence in the target language from the decoder representation; wherein the adapter layers are monolingual adapter layers (i.e., single-language adapter layers) trained using parallel data for a set of languages.

In further features, the multilingual neural machine translation system is configured where (i) each adapter layer corresponding to a language in the set of languages is trained with parallel data of at least one other language in the set of languages, and (ii) at least one adapter layer corresponding to a language in the set of languages is not trained with parallel data of at least one other language in the set of languages, to perform zero-shot translation using the encoder representation and the decoder representation that are produced by the encoder adapter layer and the decoder adapter layer, respectively, for the at least one language in the set of languages that is not trained with parallel data of at least one other language in the set of languages.

In further features, the encoder includes a plurality of transformer encoder layers forming an encoder pipeline, wherein each transformer encoder layer includes a respective encoder adapter layer for the source language.

In further features, the decoder includes a plurality of transformer decoder layers forming a decoder pipeline, wherein each transformer decoder layer includes a respective decoder adapter layer for the target language.

In further features, the encoder and the decoder comprise transformers, and wherein the encoder adapter layer and the decoder adapter layer are adapter layers comprising a feed-forward network with a bottleneck layer.

In further features, each adapter layer includes a residual connection between input of the adapter layer and output of the adapter layer.

In further features, the multilingual neural machine translation system includes: a source pre-processing unit with an initial source embedding layer trained on the plurality of languages and one or more language-specific source embedding layers that are each trained on languages that are not one of the plurality of languages; one of the initial source embedding layer and the one or more language-specific source embedding layers being configured to pre-process the input sequence to generate representations for input to the encoder; and a target pre-processing unit with an initial target embedding layer trained on the plurality of languages and one or more language-specific target embedding layers that are each trained on the languages that are not one of the plurality of languages; one of the initial target embedding layer and the one or more language-specific target embedding layers being configured to pre-process the input sequence to generate representations for input to the decoder.

In further features, the encoder and the decoder are configured with language-specific parameters that correspond to the one or more language-specific embedding layers, independent of the parameters that correspond to the plurality of languages.

In further features, the source pre-processing unit is configured with language codes that are associated with the one or more language-specific target embedding layers, independent of the initial embedding layers that are associated with the plurality of languages.

In another feature, a method of training a multilingual neural machine translation system includes: generating parallel corpora for a plurality of source languages and a plurality of target languages, wherein each parallel corpus includes pairs of first sentences and second sentences, wherein the first sentences are in a source language and the second sentences are translations of the first sentences to a target language; training a base multilingual neural machine translation system for translation from the source languages to the target languages with sampled parallel corpora, wherein the multilingual machine translation system includes an encoder for encoding a sentence in an encoder representation and a decoder configured for generating a translated sentence from the encoder representation; and training a multilingual neural machine translation system with sampled parallel corpora, wherein the multilingual neural machine translation system combines the trained base multilingual neural machine translation system with a plurality of encoder adapter layers for the source languages and a plurality of decoder adapter layers for the target languages, wherein encoder adapter layers and the decoder adapter layers are arranged, respectively, for training for translation from respective source languages to respective target languages; wherein the adapter layers are monolingual adapter layers.

In further features, (i) the monolingual adapter layers are trained using parallel data for a set of languages (ii) each monolingual adapter layer corresponding to a language in the set of languages is trained with parallel data of at least one other language in the set of languages, and (iii) at least one monolingual adapter layer corresponding to a language in the set of languages is not trained with parallel data of at least one other language in the set of languages; and wherein the multilingual neural machine translation system is configured to perform zero-shot translation using the encoder representation and the decoder representation that are produced by the encoder adapter layer and the decoder adapter layer, respectively, for the at least one language in the set of languages that is not trained with parallel data of at least one other language in the set of languages.

In further features, training the multilingual neural machine translation system includes freezing parameters of the base multilingual neural machine translation system.

In further features, generating the parallel corpora includes defining sampling hyper-parameters for each parallel corpus.

In further features, defining sampling hyper-parameters for each parallel corpus includes applying a temperature-based sampling strategy.

In further features, the method of training the multilingual neural machine translation includes training a byte pair encoding model for generating a vocabulary for the parallel corpora.

In further features, training the byte pair encoding model includes applying a temperature-based sampling strategy on sentences.

In further features, generating the parallel corpora includes prepending a control token before each source sentence of the parallel corpora to indicate the respective target language.

In further features, sampling the parallel corpora includes employing a data-loading pipeline to provide samples from the parallel corpora in training batches, wherein the data-loading pipeline is modified to group the samples in homogeneous training batches sorted by language translation directions.

In further features, the method of training the multilingual neural machine translation system includes: generating an initial set of embeddings corresponding to the plurality of languages for a source pre-processing unit of the encoder and a target pre-processing unit of the decoder; and training one or more language-specific embedding layers that are each trained on languages that are not one of the plurality of languages for a source pre-processing unit of the encoder and a target pre-processing unit of the decoder; wherein at least some parameters of the encoder and the decoder are frozen when generating the one or more language-specific embedding layers.

In further features, the method of training the multilingual neural machine translation system includes: training language-specific parameters for the encoder and the decoder that correspond to the one or more language-specific embedding layers when said generating generates the one or more language-specific embedding layers.

In yet another feature, a multilingual neural machine translation method for translating an input sequence from a source language to a target language includes: storing in a memory an encoder having a plurality of encoder adapter layers and a decoder having a plurality of decoder adapter layers; selecting, from the plurality of encoder adapter layers, an encoder adapter layer for the source language; processing, using the selected encoder adapter layer corresponding to the source language, the input sequence in the source language to generate an encoder representation; selecting, from the plurality of decoder adapter layers, a decoder adapter layer for the target language; and processing, using the selected decoder adapter layer corresponding to the target language, the encoder representation to generate a translation of the input sequence in the target language; wherein (i) the adapter layers are trained using parallel data for a set of languages, (ii) each adapter layer corresponding to a language in the set of languages is trained with parallel data of at least one other language in the set of languages, and (iii) at least one adapter layer corresponding to a language in the set of languages is not trained with parallel data of at least one other language in the set of languages; and wherein the multilingual neural machine translation system is configured to perform zero-shot translation using the encoder representation and the decoder representation that are produced by the encoder adapter layer and the decoder adapter layer, respectively, for the at least one language in the set of languages that is not trained with parallel data of at least one other language in the set of languages.

In further features, the adapter layers are monolingual adapter layers trained using parallel data for the set of languages.

In further features, the adapter layers are bilingual adapter (i.e., language-pair adapters) layers trained using parallel data for the set of languages.

In further features, storing the encoder further includes storing a plurality of transformer encoder layers forming an encoder pipeline, wherein each transformer encoder layer includes a respective encoder adapter layer for the source language.

In further features, storing the decoder further includes storing a plurality of transformer decoder layers forming a decoder pipeline, wherein each transformer decoder layer includes a respective decoder adapter layer for the target language.

In further features, the encoder and the decoder stored in said memory are transformers.

In further features, the encoder adapter layer and the decoder adapter layer stored in said memory are adapter layers comprising a feed-forward network with a bottleneck layer.

In further features, each adapter layer stored in said memory has a residual connection between input of the adapter layer and output of the adapter layer.

In further features, the multilingual neural machine translation method includes: storing in the memory a source pre-processing unit with an initial source embedding layer trained on the plurality of languages and one or more language-specific source embedding layers that are each trained on languages that are not one of the plurality of languages; selecting one from the initial source embedding layer and the one or more language-specific source embedding layers to pre-process the input sequence in the source language to generate representations for input to the encoder; and storing in the memory a target pre-processing unit with an initial target embedding layer trained on the plurality of languages and one or more language-specific target embedding layers that are each trained on the languages that are not one of the plurality of languages; selecting one from the initial target embedding layer and the one or more language-specific target embedding layers to pre-process the input sequence to generate representations for input to the decoder.

In further features, the multilingual neural machine translation method includes: storing in the memory language-specific parameters for the encoder or the decoder that correspond to the one or more language-specific embedding layers, independent of parameters stored in the memory that correspond to the plurality of languages, wherein said selecting the source embedding layer for the source language selects the language-specific parameters for the encoder or decoder when the source language is not one of the plurality of languages; and storing in the memory language-specific parameters for the encoder or the decoder that correspond to the one or more language-specific embedding layers, independent of parameters stored in the memory that correspond to the plurality of languages, wherein said selecting the target embedding layer for the target language selects the language-specific parameters for the encoder or the decoder when the target language is not one of the plurality of languages.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The accompanying drawings are incorporated into and form a part of the specification for the purpose of explaining the principles of the embodiments. The drawings are not to be construed as limiting the embodiments to only the illustrated and described embodiments. Further features and advantages will become apparent from the following and more particularly from the description of the embodiments, as illustrated in the accompanying drawings, wherein.

In the drawings, reference numbers may be reused to identify similar and/or identical elements.

DETAILED DESCRIPTION

A. The MNMT System

Figure 1:
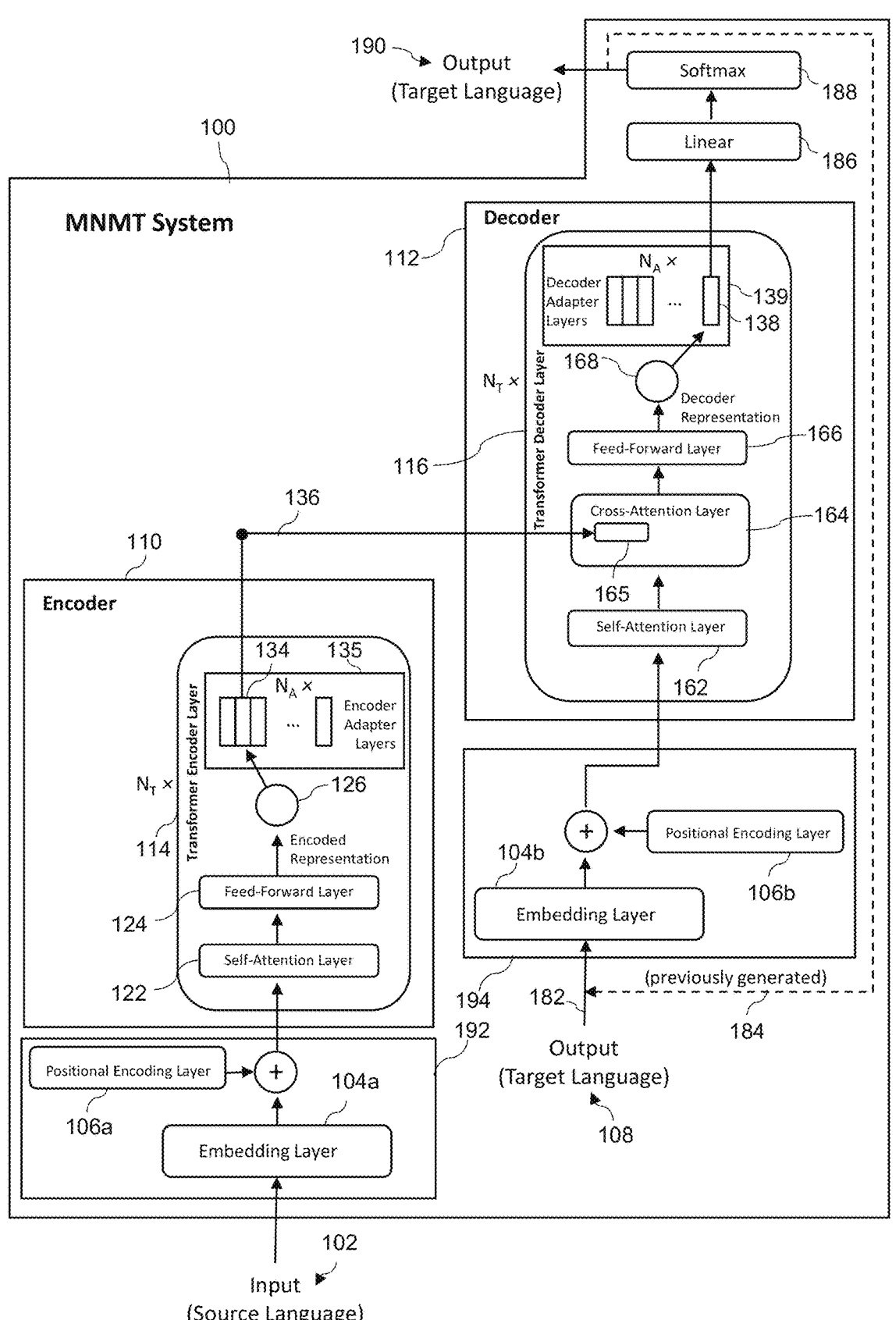
FIG. 1 illustrates a block diagram of an embodiment of an MNMT system.

FIG. 1 illustrates a block diagram of components of an MNMT system 100, which includes embedding layers 104 for receiving input sequence 102 such as a sentence. The embedding layers 104 generate embeddings which are representations that encapsulate the meaning of word or subwords (e.g., a vector with continuous values that represent an input sequence or parts of an input sequence such as words or characters). Positional encoding layers 106 inject positional information into the embeddings produced by the embedding layers 104. In one embodiment, sin and cos functions are used by the positional encoding layers 106 to inject positional information.

The encoder 110 processes input sequence 102 from a source language, that is first processed by source pre-processing unit 192 which includes the embedding layer 104a and the positional encoding layer 106a, to generate representations according to the encoder's trained parameters. The representations hold the learned information for the entire input sequence 102 that are processed by self-attention layer 122 and feed-forward layer 124. Encoder adapter selector 126 of the encoder 110 is configured for selecting source language encoder adapter layer 134 from a plurality of encoder adapter layers 135, each trained for particular source languages.

Output 136 of encoder 110 is fed to decoder 112 to determine a decoder representation for translation of the input sentence in a target language that may be employed during runtime to generate an output such as the next word of a sentence in a target language. In addition, output 108 from a target language is processed by target pre-processing unit 194, which includes the embedding layer 104*b* and the positional encoding layer 106*b*, before being fed into the decoder 112. Depending on whether the decoder is in training mode or runtime (i.e., inference mode), a sequence corresponding to a translation of the input sequence 102 is processed, all at once at 182, or an element at a time at 184 (e.g., the next word of a sentence), respectively. After a decoder representation is produced by self-attention layer 162, cross-attention layer 164 and feed-forward layer 166, decoder adapter selector 168 is configured for selecting a decoder adapter layer 138 from a plurality of decoder adapter layers 139 each trained for particular target languages.

Each of the encoder adapter layers 135 is trained to process representations, provided by the encoder pipeline, for sentences in the particular source language received as input 102 from the forward-feed layer 124 of the encoder 110. Each of the decoder adapter layers 139 is trained for a specific target language to generate, from representations provided by the forward-feed layer 166 of the decoder 112, sentences in a target language. Each of the encoder adapter layers 135 and the decoder adapter layers 139 are trained either as monolingual adapters (i.e., single-language adapters) or bilingual adapters (i.e., language-pair adapters) using parallel data (i.e., language-pair data). For a set of $N_L$ languages, parallel data may exist between each pair of languages in the set of languages (e.g., for the language set, $N_L$=3, French (FR), English (EN) and Spanish (ES), the following three language-pairs would have parallel data: FR↔EN, EN↔ES, and FR↔ES). Parallel data may alternatively exist between a subset of languages in the set of $N_L$ languages. The special case where parallel data is limited to one language is referred to herein as language-centric (e.g., for the language set, $N_L$=3, French (FR), English (EN) and Spanish (ES), parallel data that is English-centric would have the following two language-pairs: FR↔EN and EN↔ES). In some embodiments the adapter layers may be trained using a combination of both (i.e., some languages may have paired data with all other languages, while some languages may have paired data with only one or two languages (e.g., English)).

In an embodiment, encoder adapter selector 126 and decoder adapter selector 168 are configured to select the source language encoder adaptor, and the target language decoder adapter, respectively, after receiving input signals indicating the source language and the desired target language.

Encoder adapter selector 126 may also be configured for allowing by-passing the encoder adapter layer, and decoder adapter selector 168 may analogously be configured for allowing by-passing the decoder adapter layer. By-passing the adapter layers yields a base MNMT system that may be pre-trained before full MNMT system 100, including the adapter layers, is trained.

In MNMT system 100, any particular encoder adapter layer 134 for a source language (e.g., German) can be combined with any of the decoder adapter layers 139 for a target language (e.g., Italian) for translation from the source language to the respective target language, even when the system has not been trained using specific parallel data (e.g., with German-Italian language-pair data). Thereby, the architecture supports zero-shot translation in a straightforward manner when the encoder adapter layers 135 and decoder adapter layers 139 are trained. In addition as shown in Table 1 below, this architecture obviates training encoder adapter layers 134 and decoder adapter layers 139 for all combinations of $N_L$ source languages and $N_L$ target languages that may be used for later inference.

In two different embodiments of MNMT system 100, encoder layers 114 and decoder layers 116 comprise $N_T$=12 and $N_T$=6 transformer encoder layers and $N_T$=2 and $N_T$=6 transformer decoder layers, respectively. Furthermore, because the bulk of the encoder and decoder parameters are shared, training expense and storage need are reduced.

In an embodiment, encoder 110 and decoder 112 are based on the Transformer architecture described in Vaswani et al., "*Attention is all you need*", in: Advances in neural information processing systems, pp. 5998-6008 (see also arXiv.org publication 1706.03762 v5 and U.S. Pat. No. 10,452,978, which are incorporated herein by reference). In this embodiment, encoder 110 comprises a pipeline of $N_T$ transformer encoder layers 114, and decoder 112 comprises a decoder pipeline of $N_T$ transformer decoder layers 116. Each of the $N_T$ transformer encoder layers 114 processes input through self-attention layer 122 and feed-forward layer 124. Each of the $N_T$ transformer decoder layers 116 processes input through self-attention layer 162, cross-attention layer 164 and feed-forward layer 166.

Generally attention mechanisms allow for the amplification of relevant signals in a neural network, similar to the way a human is able to intuitively focus on certain parts of an image and know what is important. Self-attention mechanisms are attention mechanisms that relate different positions of a sequence (e.g., determining correlation of words in a sentence). Transformers are one way to implement a self-attention mechanism that maps queries (i.e., the task—e.g., search, translation) against a set of keys (i.e., relevance of the query—e.g., an item title) to present values (i.e., the contents being queried—e.g., best matched item in a database). One way transformers compute similarity between queries and keys is using a dot product. Those skilled in the art will appreciate that for the MNMT system 100 described herein alternate attention mechanisms may be used to carry out the methods described herein.

Self-attention layer 122 processes input according to the attention mechanism as described in Vaswani et al. cited above. Each of the $N_T$ transformer decoder layers 116 comprises self-attention layer 162, cross-attention layer 164 comprising cross-attention 165, and feed forward layer 166. Cross-attention layer 164 of each decoder layer attends to output of encoder adapter layer 134 according to the attention mechanism of the transformer architecture. The source language encoder adapter layer 134 feeds its output to the next encoder layer, or, in the case of the topmost encoder layer, to the transformer decoder layer 116. In this embodiment, output of the topmost encoder layer is received via 136 at cross-attention 165. The decoder adapters 139 process output of forward layer 166 with respect to the specific target language.

It is to be understood that all $N_T$ encoder layers have the same structure as illustrated transformer encoder layer 114 to subsequently process the input, and involve selection of an encoder adapter layer for a same source language. Only the topmost encoder layer feeds output to the decoder pipeline. Similarly, all $N_T$ decoder layers have the same structure as illustrated transformer decoder layer 116, and involve selection of decoder adapter layers for a same target language. Further, linear layer 186 (i.e., vocabulary projection matrix) maps each vector representation to a set of unnormalized weights, and a softmax layer 188 takes as input a set of unnormalized weights and produces as an output sequence 190 that is normalized and non-negative. Those skilled in the art will appreciate that in an embodiment the embedding layer 104*b* and the linear layer 186 may be the same layers (i.e., tied). The output sequence 190 may include T vectors of dim K (with T: output length, K: vocab size), where each vector sums to one. More specifically, the linear layer 186 maps the outputs of the last decoder adapter layer (T vectors of dim D) to vectors of the same size as the target vocabulary of the vocabulary projection matrix (T vectors of dim K).

According to another embodiment, encoder 110 and decoder 112 of MNMT system 100 may comprise recurrent neural networks.

Figure 2:
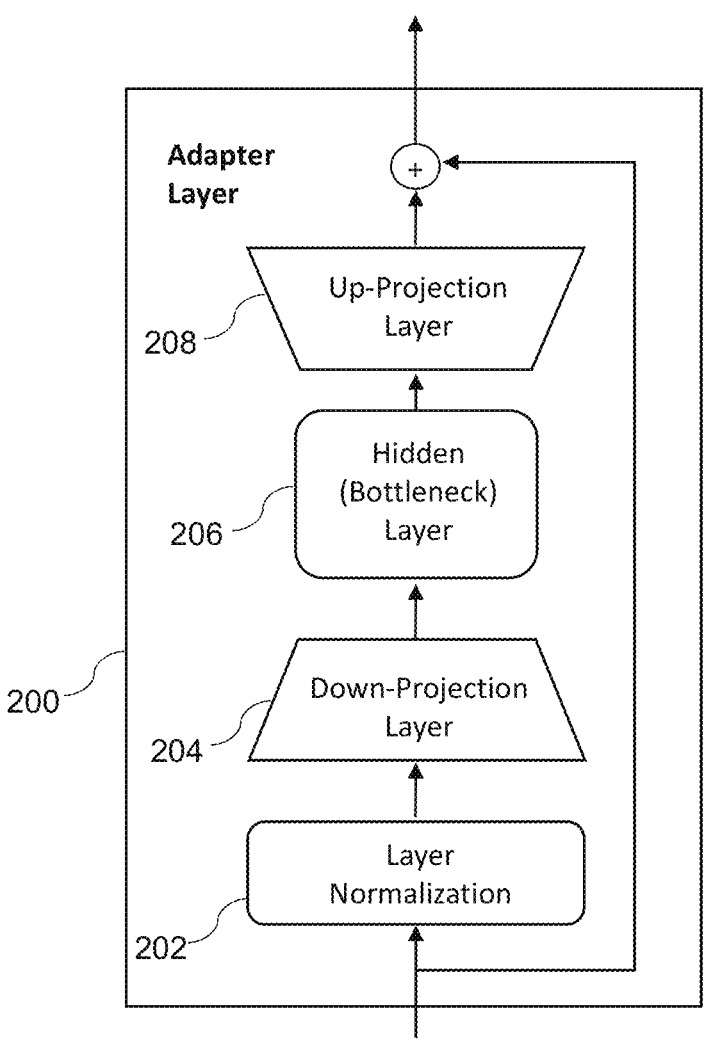
FIG. 2 illustrates a block diagram of an adapter layer architecture used in embodiments.

FIG. 2 illustrates a block diagram of an adapter layer architecture that comprises a feed-forward network with a bottleneck layer described by Bapna et al., in "Simple, Scalable Adaptation for Neural Machine Translation" (published in Proceedings of EMNLP-IJCNLP 2019, pages 1538-1548, and in arXiv Sep. 18, 2019 publication 1909.08478, which are incorporated herein by reference) which is implemented in an embodiment by encoder adapter layers 135 and decoder adapter layers 139 shown in FIG. 1. Adapter layer 200 comprises layer normalization 202 followed by down-projection layer 204. Layer normalization 202 may be implemented as described in Ba et al., "*Layer normalization*", *arXiv.org publication* 1607.06450, which is incorporated by reference, which implements a normalization method to improve the training speed by directly estimating normalization statistics from the summed inputs to the neurons within a hidden layer.

Down-projection layer 204 projects its input to a hidden layer (i.e., bottleneck layer) 206 with lower dimension. A non-linear activation function such as ReLU may be employed in hidden layer 206. The only hyper-parameter of adapter layer 200 may be the dimension of hidden layer 206, which forms a bottleneck that allows limiting the number of parameters of adapter layer 200. The use of "hyper-parameter" is distinguished herein from "parameter" which is a learned weight of a model. The adapter layer 200 may comprise a residual connection (i.e., a skip connection) between input of the adapter layer and output of the adapter layer, which adds a copy of the input to adapter layer 200 to output of up-projection layer 208. Employing the residual connection and employing a near identity initialization enables a pass-through over adapter layer 200.

B. Training the MNMT System

Training of the MNMT system described with reference to FIGS. 1 and 2 advantageously limits the number of adapter layers that require training, irrespective of the availability of the parallel data used to train the adapter layers. In the case of bilingual adapters, between $2*N_L*(N_L-1)$ $\geq N_A \geq 4*(N_L-1)$ adapter layers may be employed. The number of bilingual adapters is dependent on the availability of language-pair data: with a minimum of $N_A=4*(N_L-)$ adapter layers in the case of a "language-centric system" when parallel data is available for one language with all combinations of source languages $N_L$ and target languages $N_L$, and a maximum of $N_A=2*N_L*(N_L-1)$ adapter layers in the case of a "fully-multilingual system" when parallel data is available for all possible combinations of source languages $N_L$ and target languages $N_L$. In contrast, in the case of monolingual adapters $N_A=2*N_L$ monolingual adapter layers are required (which is referred to herein as a "language-specific system") regardless of the availability of language-pair data. For example, a fully-multilingual system with $N_L=3$ source/target languages requires a total of 12 bilingual adapter layers (6 encoder adapter layers and 6 decoder adapter layers), whereas a language-specific system with $N_L=3$ source/target languages requires a total of 6 monolingual adapter layers (3 encoder adapter layers and 3 decoder adapter layers).

Figures 3A, 3B:
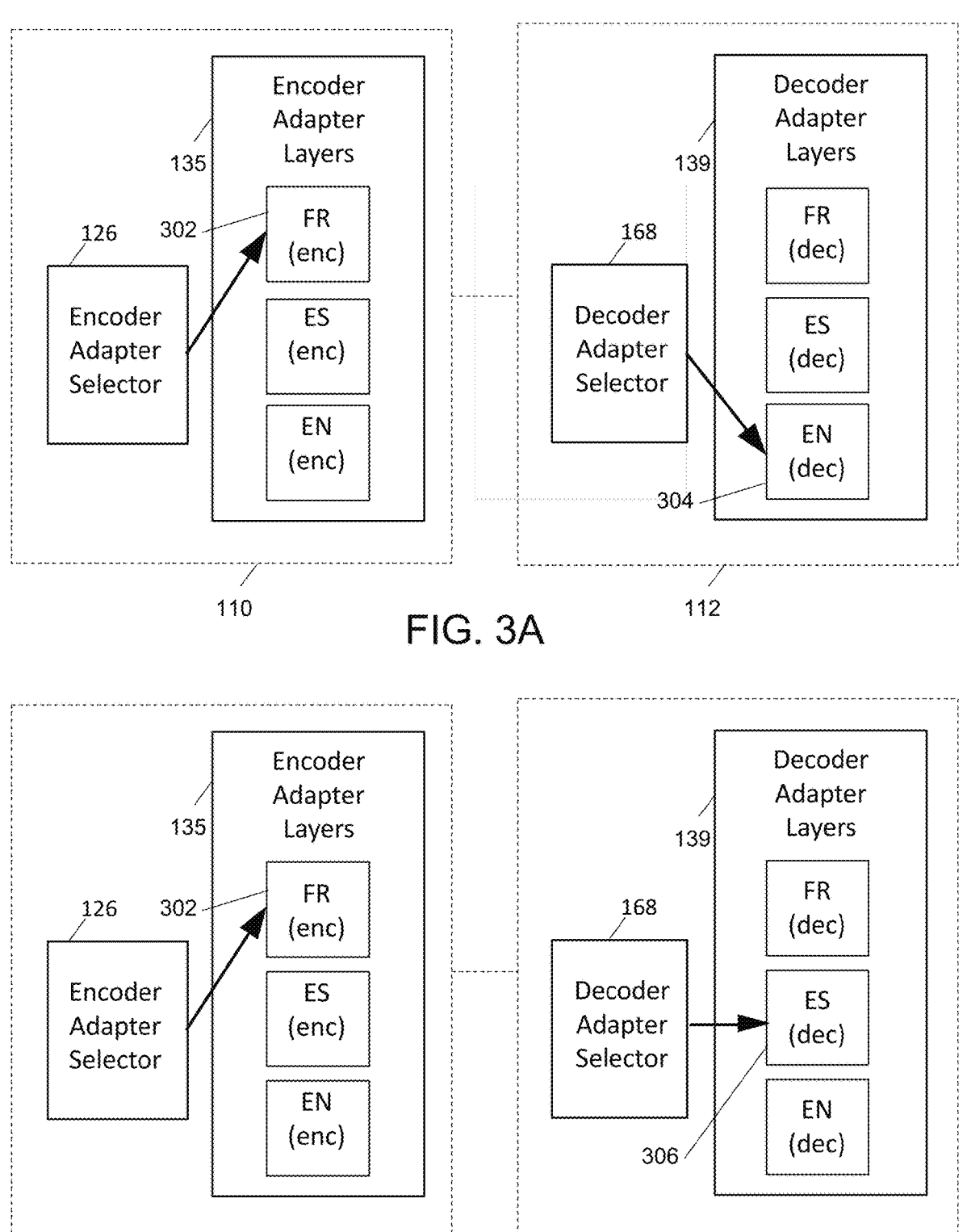
FIG. 3A and FIG. 3B illustrate example settings for training and running, respectively, using monolingual adapter layers.

FIG. 3A and FIG. 3B illustrate example settings for training and operating (i.e., at inference), respectively, using monolingual adapter layers for a set of 3 languages (FR, ES and EN), which has encoder adapter layers 135 and a corresponding decoder adapter layers 139. FIG. 3A illustrates example settings of encoder adapter selector 126 and decoder adapter selector 168 for monolingual encoder adapter layer 302 and monolingual decoder adapter layer 304, respectively, when training using French (FR) to English (EN) parallel data. FIG. 3B illustrates example settings of encoder adapter selector 126 and decoder adapter selector 168 for monolingual adapter layers 302 and 306, respectively, when translating from French (FR) to Spanish (ES).

Figure 4A:
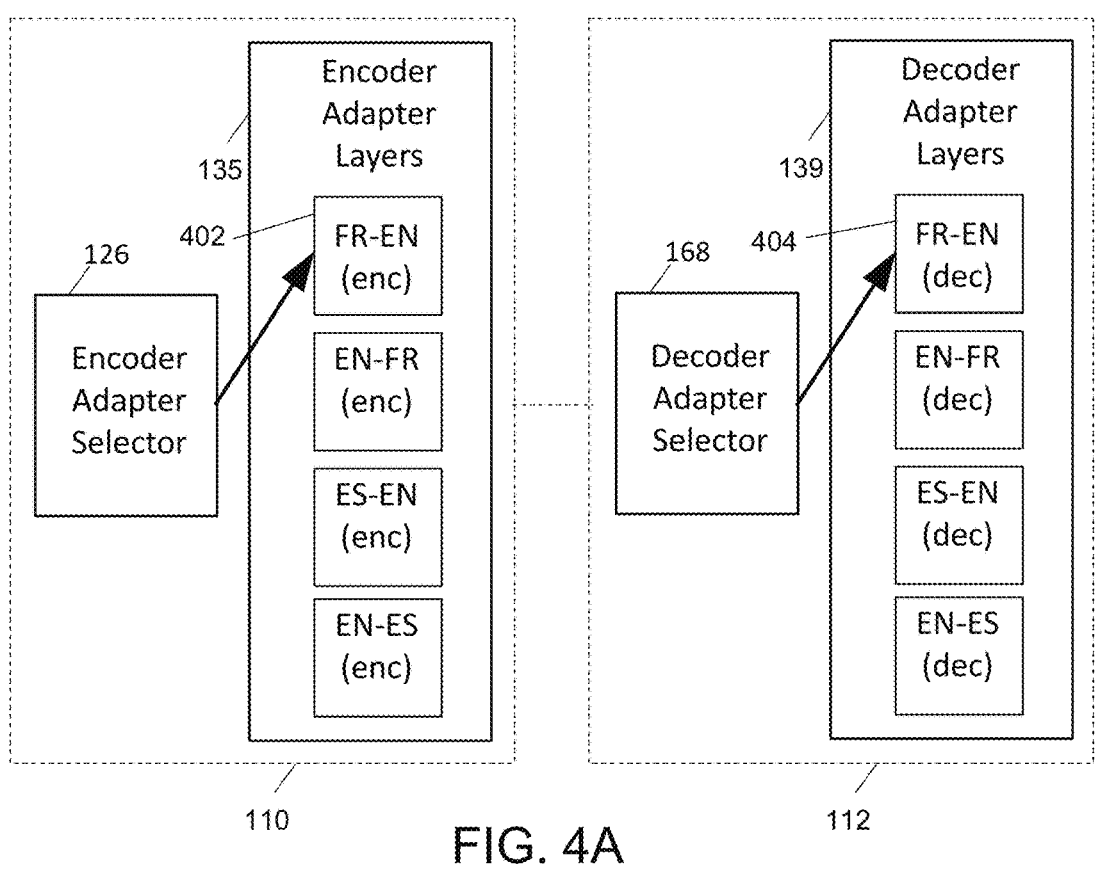
FIG. 4A and FIG. 4B illustrate example settings for training and running, respectively, using bilingual adapter layers.
Figure 4B:
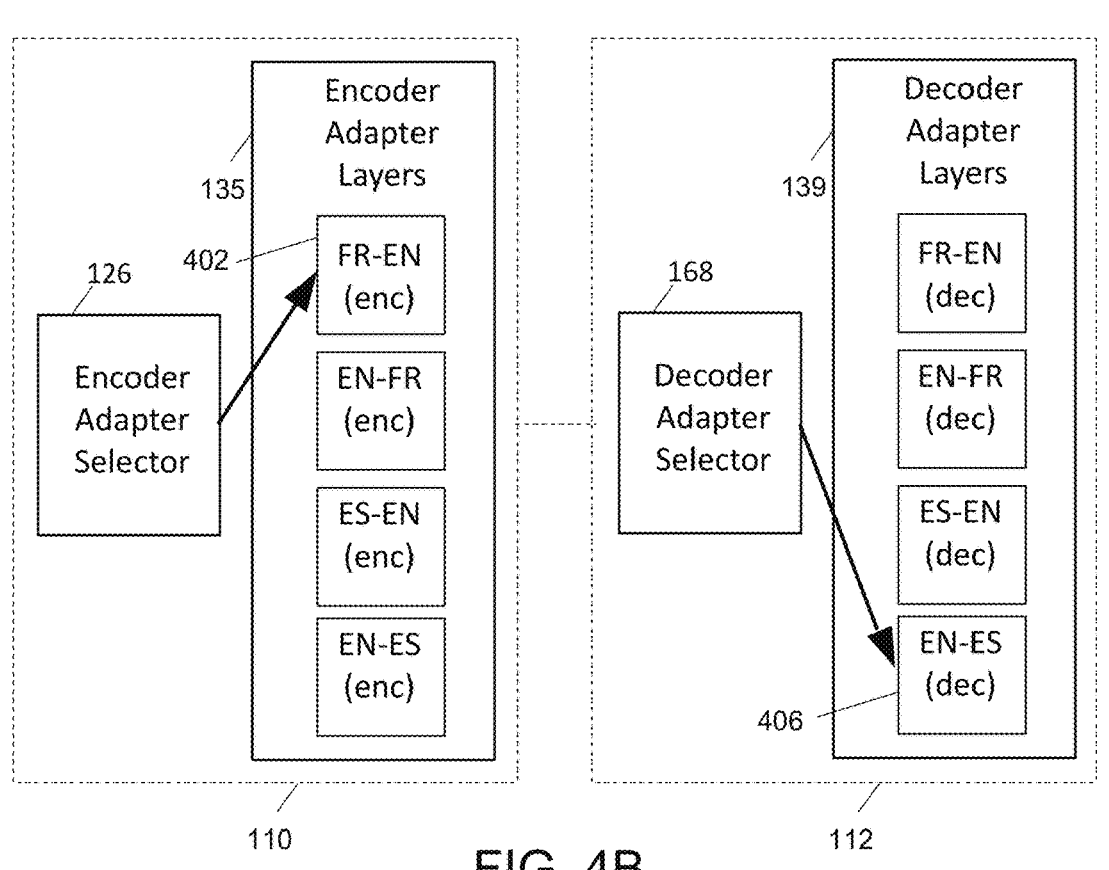

FIG. 4A and FIG. 4B illustrate example settings for training and operating (i.e., at inference), respectively, using bilingual adapter layers for a set of 3 languages (FR, ES and EN), where each language is trained with English parallel data (i.e., English-centric), which has encoder adapter layers 135 and a corresponding decoder adapter layers 139. FIG. 4A illustrates example settings of encoder adapter selector 126 and decoder adapter selector 168 for bilingual adapter layers 402 and 404, respectively, when training using French (FR) to English (EN) parallel data. FIG. 4B illustrates example settings of encoder adapter selector 126 and decoder adapter selector 168 for bilingual adapter layers 402 and 406, respectively, when translating from French (FR) to Spanish (ES) using the FR-EN encoder adapter layer 402 and the EN-ES decoder adapter layer 406 (for a zero-shot translation). As shown in FIG. 4A and FIG. 4B, a total of 8 adapter layers are required for such an MNMT system with bilingual adapters, in comparison 6 adapter layers would be required for such an MNMT system with monolingual adapters (shown in FIG. 3A and FIG. 3B), and 12 adapter layers would be required for a fully-multilingual MNMT system (not shown).

Both the monolingual adapter layers and the bilingual adapter layers disclosed herein enable zero-shot translation when parallel data does not exist for a specific language-pair at training time (e.g., in the case of English centric data where only language-pairs of training data exist between English and other languages). For example, the disclosed embodiments enable zero-shot translation between languages other than English (e.g., French (FR) and Spanish (ES)) as shown in FIGS. 3B and 4B. FIG. 3B illustrates the settings of monolingual encoder adapter selector 126 and monolingual decoder adapter selector 168 for performing zero-shot translation from French (FR) to Spanish (ES) using FR monolingual encoder adapter 302 and ES monolingual decoder adapter 306 in an MNMT system trained without FR-ES parallel data. FIG. 4B illustrates the settings of bilingual encoder adapter selector 126 and bilingual decoder adapter selector 168 for performing zero-shot translation from French (FR) to Spanish (ES) using FR-EN bilingual encoder adapter 402 and EN-ES bilingual decoder adapter 406 in an MNMT system trained without FR-ES parallel data.

Table 1 is an overview of parameters required for different approaches for adapting MNMT models for translation between a set of $N_L$ languages, which illustrates the advantage of minimizing the number of adapters $N_A$ required for an MNMT system.

TABLE 1

| approach | no. of adapter layers $N_A$ | zero-shot |
|---|---|---|
| 1. full-model | $N_A = 0$ | n/a |
| 2. bilingual adapters (fully-multilingual) | $N_A = 2 * N_L * (N_L - 1)$ | n/a |
| 3. bilingual adapters (pivot) | $2 * N_L * (N_L - 1) > N_A \geq 4 * (N_L - 1)$ | yes |
| 4. monolingual adapters | $N_A = 2 * N_L$ | yes |

Table 1 shows four different approaches for arranging the number of adapter layers $N_A$ for translating between $N_L$ different languages, and whether each approach may be configured to perform zero-shot translation. The first approach (full-model) involves fine-tuning a full model for each language-pair without using any adapter layers. The language model of the first approach requires a greater number of parameters than the models of the other approaches that use adapter layers. The second approach (bilingual adapters fully-multilingual) and third approach (bilingual adapters pivot) involve fine-tuning for language-pair tasks of an MNMT system with bilingual adapter layers. Unlike the third approach which may be configured to perform zero-shot translation, the second approach is fully-multilingual with all adapter layers trained on parallel data with all other languages $N_L$, which results in $N_A = 2*N_L*(N_L-1)$ adapter layers. In contrast, the third approach is not trained with parallel data for each language-pair and may result in the following range of adapter layers: $2*N_L*(N_L-1) > N_A \geq 4*(N_L-1)$. The special case of language-centric parallel data for the approach using bilingual adapters is a lower bound that requires $N_A = 4*(N_L-1)$ adapter layers for translating between $N_L$ languages. The fourth approach, which involves fine-tuning an MNMT system with monolingual adapter layers which are specific to one language requires only $N_A = 2*N_L$ adapter layers for translating between $N_L$ languages, and which may be configured for zero-shot translation.

Table 2 summarizes the increase in parameters required for adapting the respective models for 20 languages.

TABLE 2

| type | full-model | bilingual-full | monolingual-1024 | monolingual-64 |
|---|---|---|---|---|
| bottleneck | n/a | 64 | 1024 | 64 |
| increase | ×380 | ×4.53 | ×3.73 | ×1.47 |

Table 2 compares a known MNMT model with regular fine tuning without adapter layers ("full-model") and a known MNMT model with fully-multilingual bilingual adapter layers ("bilingual-full") where parallel training data exists between each language, with two embodiments of the MNMT system disclosed herein with monolingual adapter layers, monolingual-64 and monolingual-1024, regarding the increase in parameters ("increase" in Table 2) for adaptation to the 20 languages. Monolingual-64 and monolingual-1024 are MNMT models with monolingual adapter layers described above with reference to FIGS. 1 and 2, where hidden layer 206 (i.e., bottleneck layer) has dimensions 64 and 1024 ("bottleneck" in Table 2), respectively. The example monolingual-1024 has been selected so that the total number of parameters of this MNMT model is comparable to the total number of parameters of the known MNMT model with fully-multilingual bilingual adapter layers ("bilingual-full") in requiring roughly a factor of four in parameter increase.

Figure 5:
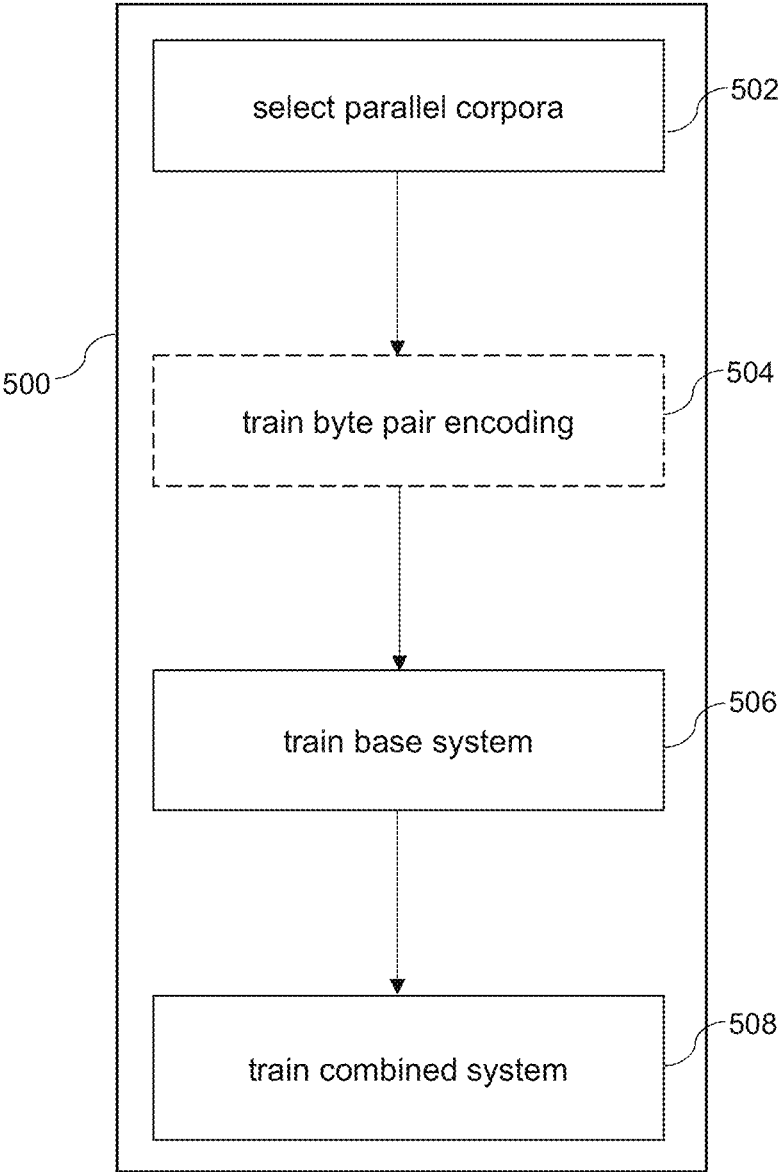
FIG. 5 illustrates a flow diagram of a method for training an MNMT system according to embodiments.

FIG. 5 illustrates a flow diagram of a method 500 for training the MNMT system 100 according to embodiments. Method 500 comprises constructing at 502 parallel corpora from a training corpus wherein each parallel corpus $D_{xx \rightarrow yy} = (x_i, y_i)$ comprises collections of first sentences $x_i$ in a first set of languages and corresponding translations as second sentences $y_i$ in a second language.

In an embodiment, selecting the parallel corpora may comprise configuring a temperature-based sampling strategy. Available training corpora of the world's languages contain large imbalances between languages, so that the number of example sentences involving particular languages usually differs considerably between languages. For translation between smaller languages, parallel corpora are often not available at all.

Employing a temperature-based sampling strategy mitigates the effect of these imbalances on the performance of the trained MNMT system 100. Configuring the temperature-based sampling strategy comprises determining a specific sampling frequency for each parallel corpus based on the sizes of the corpus and on a temperature parameter. In an embodiment, the temperature parameter is chosen as T=5. The temperature-based sampling strategy may be configured as described in Arivazhagan et al., "Massively multilingual neural machine translation in the wild: Findings and challenges", arXiv.org publication 1907.05019, which is incorporated by reference.

Employing a temperature-based sampling strategy involves sampling language-pairs with smaller parallel corpora with an increased sampling probability, so that they are sampled more frequently than they otherwise would have been. In an alternate embodiment that does not use temperature-based sampling (equivalent to setting a temperature of 1), language-pairs will be sampled with a probability that is proportional to the size of their parallel corpora. In another alternate embodiment where the sampling temperature is set to a very high value, all language-pairs will be sampled with the same probability. And in another embodiment where it is set to value close to zero, only the language-pair whose parallel corpus is the largest will be sampled.

According to a particular embodiment, the corpus may be pre-processed at 504 with merge operations by training a Byte Pair Encoding model as described in Sennrich et al., "Neural machine translation of rare words with subword units", in: Proceedings of the 54th Annual Meeting of the ACL, pp. 1715-1725, which is incorporated by reference. Byte pair encoding model involves iteratively replacing most frequent pairs of symbols and replacing each occurrence of one of the most frequent pair with a new, previously unused symbol. Each merge operation produces a new symbol which represents an n-gram. Applying byte pair encoding model allows reducing text length so that efficiency of the neural networks passing information can be increased at the cost of increasing vocabulary size. This approach hence allows manipulating the trade-off between vocabulary size and text size.

In an embodiment, training the byte pair encoding model employs a further temperature-based sampling to ensure that subwords in each language are represented adequately. According to this embodiment, the language vocabularies may be processed to create a list of lines of tokens, wherein each line comprises tokens occurring in the vocabulary with a particular frequency. For merging the vocabularies, each line is sampled according to a weight that depends on a temperature parameter and the number of lines in the list.

Method 500 further comprises training at 506 a base MNMT system for translation between a plurality of languages of the constructed parallel corpora. The base MNMT system may correspond to an encoder-decoder, such as MNMT system 100 described above, but without including encoder adapter layers 135 and decoder adapter layers 139. In the base MNMT system, encoder adapter selector 126 and decoder adapter selector 168 are set to a by-pass of the adapter layers 135 and 139, respectively.

Method 500 further comprises training at 508 the MNMT system for translation between a plurality of languages of the constructed parallel corpora, involving training encoder adapter layers 135 and decoder adapter layers 139. In embodiments, MNMT system 100 is trained by fine tuning only parameters $$\theta_{xx}^E$$

of the encoder adapter layers for source languages xx and parameters $$\theta_{yy}^D$$

of the decoder adapter layers for target languages yy, while the further parameters of the MNMT system, as optimized during step 506, remain fixed.

Training the combined MNMT system at 508 may comprise selecting a language direction XX→YY and employing the parallel corpus $D_{xx\rightarrow yy}$ constructed in step 502 to fine tune the specific encoder adapter layer for language XX and the specific decoder adapter layer for language YY. In an embodiment, training the combined MNMT system for translation XX→YY may comprise prepending a control token before each source sentence $x_i$ from $D_{xx\rightarrow yy}$ to indicate target language YY, and selecting encoder adapter selector 126 and decoder adaptor selector 168 that corresponds to the source language xx and the target language YY, respectively.

In an embodiment, training the MNMT systems comprises training of transformer-based systems by inputting a source language sentence $x_i$ to the first transformer encoder layer 114 of the encoder layer pipeline. The lowest transformer decoder layer 116 of the pipeline of decoder layers is fed right-shifted sentence $y_i$ to learn to predict the next words to be included in the sentence in the target language. The MNMT system is trained to predict the full target sentence sequence by looking at the previous words.

According to embodiments, training the combined MNMT system comprises freezing the parameters of the base MNMT system. Hence, training expense is significantly reduced because only the relatively few parameters of the language adapter layers must be trained, while the parameters of the base MNMT model are reused for each fine tuning step.

After training the base MNMT system at 506, the combined MNMT model is trained at 508. In the case of bilingual adapters, training the combined MNMT model may be performed according to Method A in Table 3.

TABLE 3

| Method A: Training bilingual adapters |
| --- |
| Input: dataset D of parallel sentences |
| Result: $\Theta$, $\theta_{xx}^E$, $\theta_{yy}^D$ |
| Fit $\Theta$ to D; |

TABLE 3-continued

| Method A: Training bilingual adapters |
| --- |
| while not converged do |
|   \|    for xx, yy in language_directions do |
|   \|      \|    Fit $\theta_{xx}^E$, $\theta_{yy}^D$ to $D_{xx\rightarrow yy}$; |
|       end |
| end |

In the case of monolingual adapters, training the combined MNMT model may be performed by (i) sampling a batch of line pairs for one language-pair; (ii) updating corresponding adapters; and (iii) repeating (i) and (ii) for each batch of line pairs.

In embodiments, training the combined MNMT model employs data loading pipelines that provide batches to the MNMT system. According to embodiments, the data loading pipeline may be configured to group the samples in homogeneous training batches which are sorted by language directions XX→YY. Employing homogenous training batches may have the advantage of leveraging parallel optimization of GPU employed for training the combined MNMT model. Ensuring that the training batches only relate to the same adapter layers avoids mixed batches, which would imply that filtering the gradient descent direction depending on the language would be required. Modifying the data-loading pipeline may also employ meta information in the batches to build a computational graph with the relevant adapter layers.

Because each encoder layer is trained to translate from a particular source language and each decoder layer is trained to translate to a particular target language, the trained combined MNMT model may be applied for zero-shot translation in a straightforward manner. In embodiments, particular combinations of the plurality of languages may not have a parallel corpus. Consequently, training an MNMT system according to a method 500 yields an MNMT system that is able to translate between a language-pairs without parallel corpora $D_{xx\rightarrow zz}$.

C. Exemplary Implementation of the MNMT System

To implement the disclosed MNMT system, the TED corpus as described in Qi et al., *"When and why are pre-trained word embeddings useful for neural machine translation?"*, in: Proceedings of the 2018 Conference of the NAACL: Human Language Technologies, Vol. 2, pp. 529-535, which is incorporated by reference, may be employed, which is a multi-parallel corpus wherein each English sentence has translations in multiple languages. The corpus was restricted to the top 20 languages, which resulted in training corpora ranging between 220,000 and 108,000 parallel sentences. The dataset has been employed with data aligned in each language direction. Further, an English-centric setting has been simulated by only using parallel corpora with English as one of the languages.

The transformer architecture has been implemented using the fairseq toolkit (see Ott et al., *"fairseq: A fast, extensible toolkit for sequence modeling"*, arXiv:1904.01038, which is incorporated by reference), which has been modified to include monolingual adapter layers and bilingual adapter layers. Byte pair encoding model has been implemented to yield a vocabulary of 70,000 employing training data from all languages. The implemented system specifically has a transformer-based architecture with four attention heads, while the encoder and decoder pipelines comprise six encoder layers and six decoder layers, respectively. The transformer embedding size has been chosen as 512, while the feed forward dimension has been chosen as 1024.

The base MNMT system (at 506 in FIG. 5) has been trained for 120 epochs with the constructed English-centric training data that correspond to 38 language-pairs. Combining the trained base MNMT system with the adapter layers (at 508 in FIG. 5), the adapter layer parameters have been optimized for 60 epochs with the same English-centric training data.

In a different evaluation study, the language adapter layers have been trained with data in all 380 language-pairs. In this setting, the parameters of the adapter layers have been optimized for only ten epochs to compensate for the increase in training time due to the larger size of the training data. For this evaluation study, the hidden dimensions of the adapter layers have been chosen as 64 and 1024.

D. Evaluation of the MNMT System

The base MNMT model scores well with 30.77 BLEU (BiLingual Evaluation Understudy) score on Arabic (AR) to English (EN), AR→EN, as compared to 28.32 BLEU score reported in Aharoni et al., "Massively multilingual neural machine translation", Proceedings of the 2019 Conference of the North American Chapter of the Association for Computational Linguistics: Human Language Technologies, Volume 1, pages 3874-3884, 2019, which is incorporated herein by reference. The base MNMT model scores 28.36 BLEU on English (EN) to German (DE), EN→DE, as compared to 27.95 BLEU reported by Aharoni et al. cited above.

Figure 6:
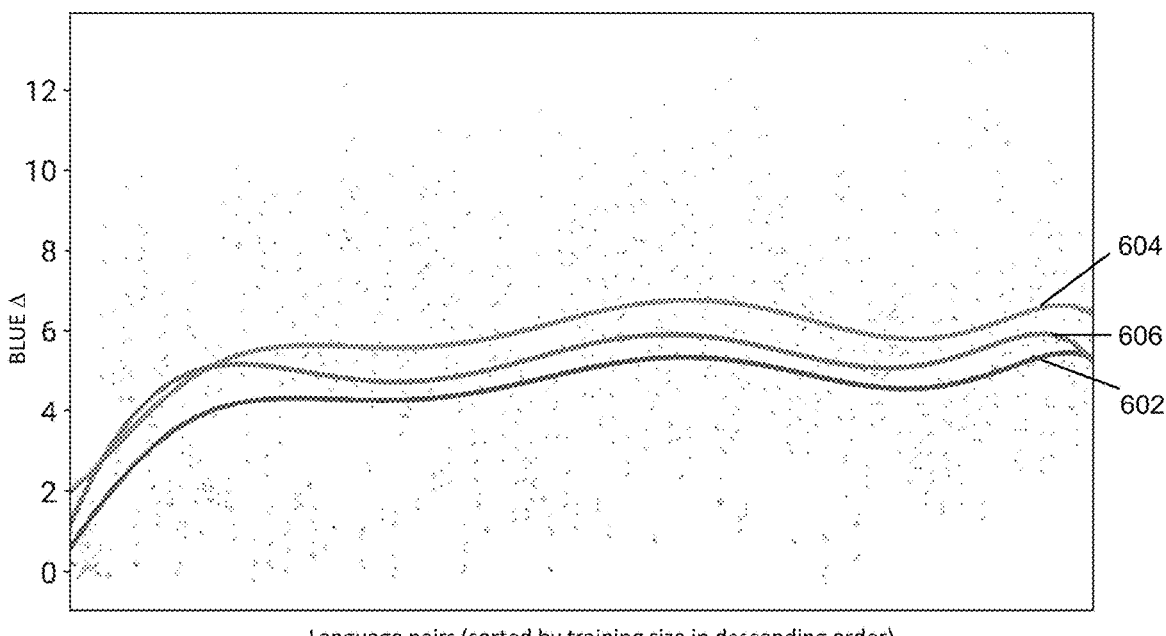
FIG. 6 shows relative improvements in translation performance achieved by an MNMT system according to an embodiment.

FIG. 6 shows BLEU score differences between the base MNMT model and the combined MNMT model. FIG. 6 shows absolute differences in BLEU score for each of the 380 language-pairs sorted on the x axis by the size of available training data. System bilingual-64 (at 606), which system is fully-multilingual system as defined above, with hidden dimension 64, employing bilingual adapter layers as described in Bapna et al., cited above, is compared with two embodiments of the MNMT model 100, monolingual-64 (at 602) and monolingual-1024 (at 604), employing language-specific (i.e., monolingual) adapters with hidden dimension of 64, and 1024, respectively. The lines in FIG. 6 are trend lines computed by interpolating a polynomial of degree 7 over the individual data point. As can be inferred from the trend lines, monolingual-64 (at 602) performs slightly but consistently worse than bilingual-64 (at 606). However, monolingual-1024 (at 604) outperforms bilingual-64 (at 606) with differences ranging from −0.28 BLEU score to +13.24 BLEU score on the individual language-pairs, with a median of +5.80 BLEU score. It is to be noted that monolingual-1024 (at 604) has a lower parameter budget than bilingual-64 (at 606), as shown in Table 2.

Because multilingual models are known to show lower performance on translations involving high resource languages, the performance of the disclosed systems have been studied specifically on translation to and from English (i.e., language-pairs EN→XX and XX→EN). For EN→XX, monolingual-1024 (at 604), with a median of +1.56 BLEU score, consistently outperforms both bilingual-64 (at 606), which has a median of +1.27 BLEU score, and monolingual-64 (at 602), which has a median of +0.49 BLEU score. Here, the median values are computed over the 19 languages. For XX→EN however, bilingual-1024 (at 606), with median +1.04 BLEU score, is slightly superior to both monolingual- 64 (at 602) and monolingual-1024 (at 604), with respective medians +0.15 BLEU score and +0.69 BLEU score.

As explained above, the disclosed MNMT systems allow for adaption for zero-shot translation. For evaluating performance of the described systems on zero-shot translation, combined MNMT systems (trained at 508 in FIG. 5) have been trained on English-centric data only and are employed to translate among language-pairs not involving English. In the training setting as described above this procedure leads to 342 (19*18) language directions of zero-shot translation.

Figure 7:
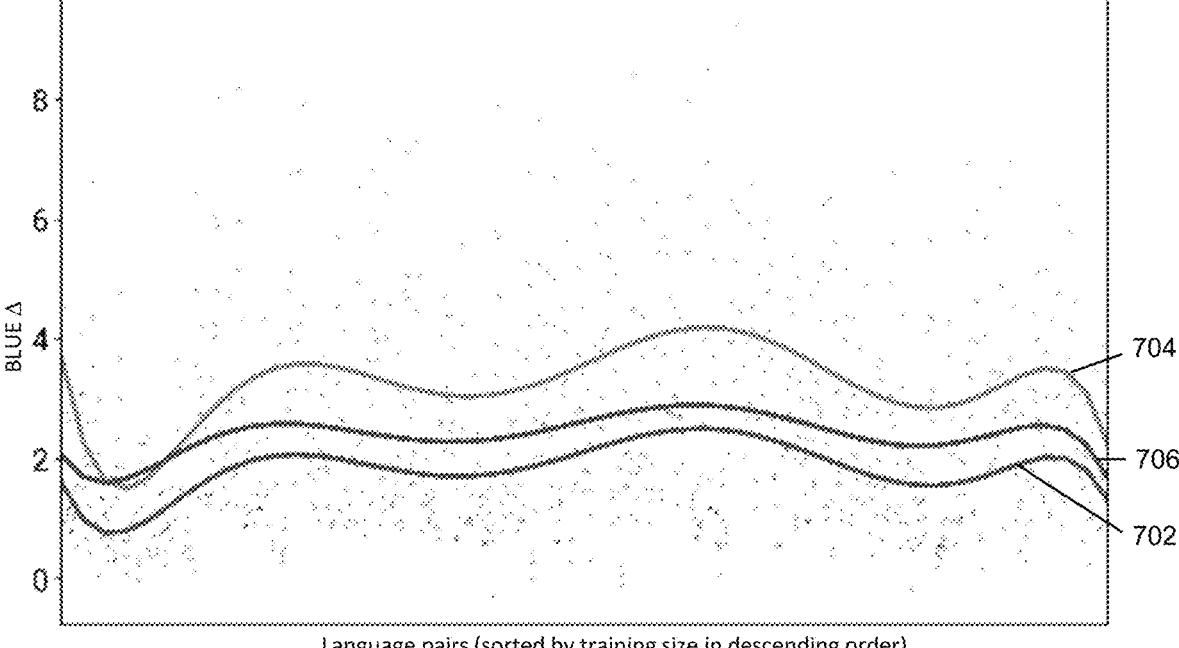
FIG. 7 shows relative improvements in translation performance in zero-shot translation achieved by an MNMT system according to an embodiment.

FIG. 7 shows relative improvements in BLEU scores over the base MNMT system over these 342 language directions. In more detail, the results of FIG. 7 show that monolingual-64 (at 702) yields a median improvement of 1.42 BLEU score, while monolingual-1024 (at 704) yields a median improvement of +2.67 BLEU score. The smallest differences are +0.60 BLEU score and +0.73 BLEU score, respectively, which indicates that employing language-specific adapted layers systematically improves translation quality. FIG. 7 also shows performance of system bilingual-64 (pivot) (at 706) with bilingual adapters layers. To translate XX→YY in zero-shot employing bilingual-64 (at 706), the bilingual adapters adapter layer corresponding to XX→EN is selected at the encoder and the bilingual adapters adapter layer for EN→YY is selected at the decoder. To generate the bilingual-64 (pivot) (at 706), the corresponding MNMT system has been trained by employing only training data for XX→EN and EN→YY. As can be inferred from the result of FIG. 7, bilingual-64 (pivot) (at 706) using bilingual adapter layers with English as the pivot language slightly outperforms monolingual-64 (at 702) but is inferior to monolingual-1024 (at 704), using language-specific adapter layers.

Systems and methods of this disclosure hence set forth an adapter layer formalism for MNMT that is more parameter-efficient than known systems and methods, while also achieving high performance in zero-shot translation. Additional evaluation that sets forth the effectiveness of monolingual adapters is disclosed by Berard et al. in "Monolingual Adapters for Zero-Shot Neural Machine Translation", published in Proceedings of the 2020 Conference on Empirical Methods in Natural Language Processing (EMNLP), Association for Computational Linguistics, Online, pp. 4465-4470, The 2020 Conference on Empirical Methods in Natural Language Processing, Virtual conference, Nov. 16, 2020, which is incorporated herein by reference.

E. Continual Learning

Continual learning involves adding a new language without retraining a trained MNMT system with an initial set of languages, which may be addressed by fine-tuning the trained MNMT system with the new language of interest that was not included with the initial set of languages. That is, a new source or target language may be added to a trained MNMT system, such as MNMT system 100, without retraining the trained MNMT system on the initial set of languages.

Figure 8:
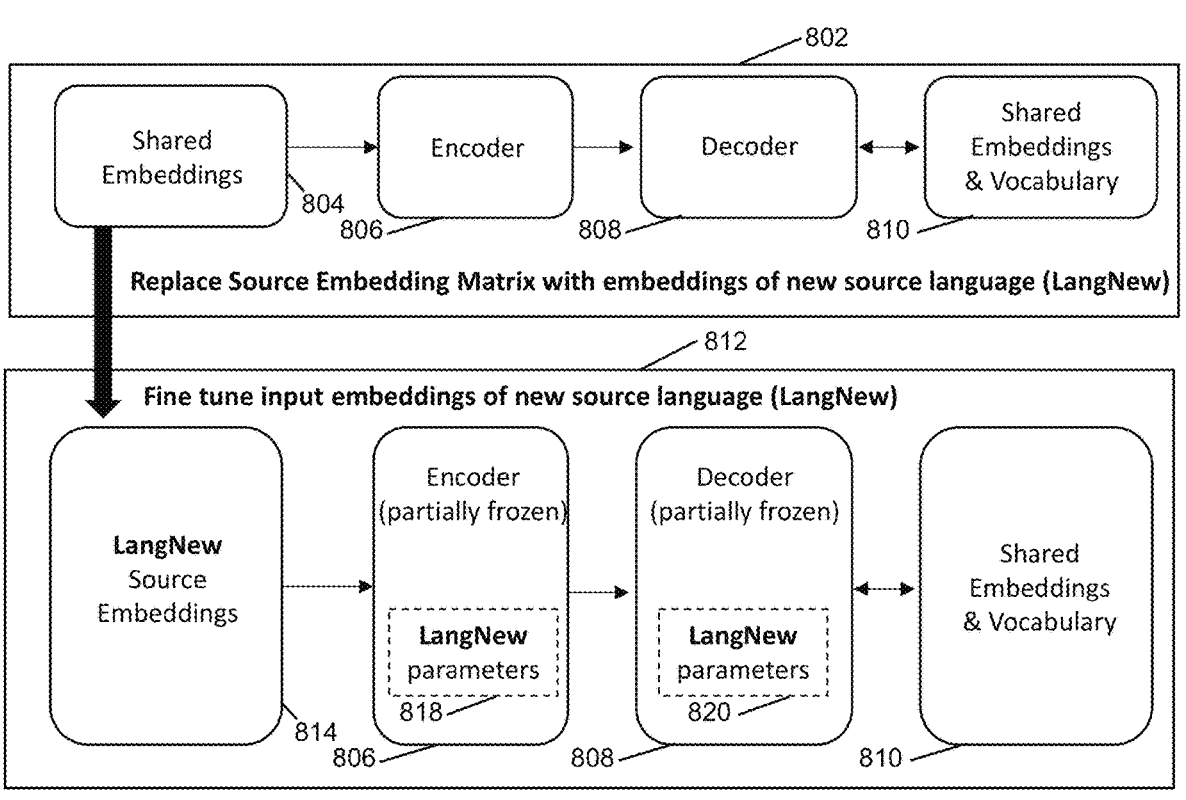
FIG. 8 illustrates a method for adding a new source language with incremental training.
Figure 9:
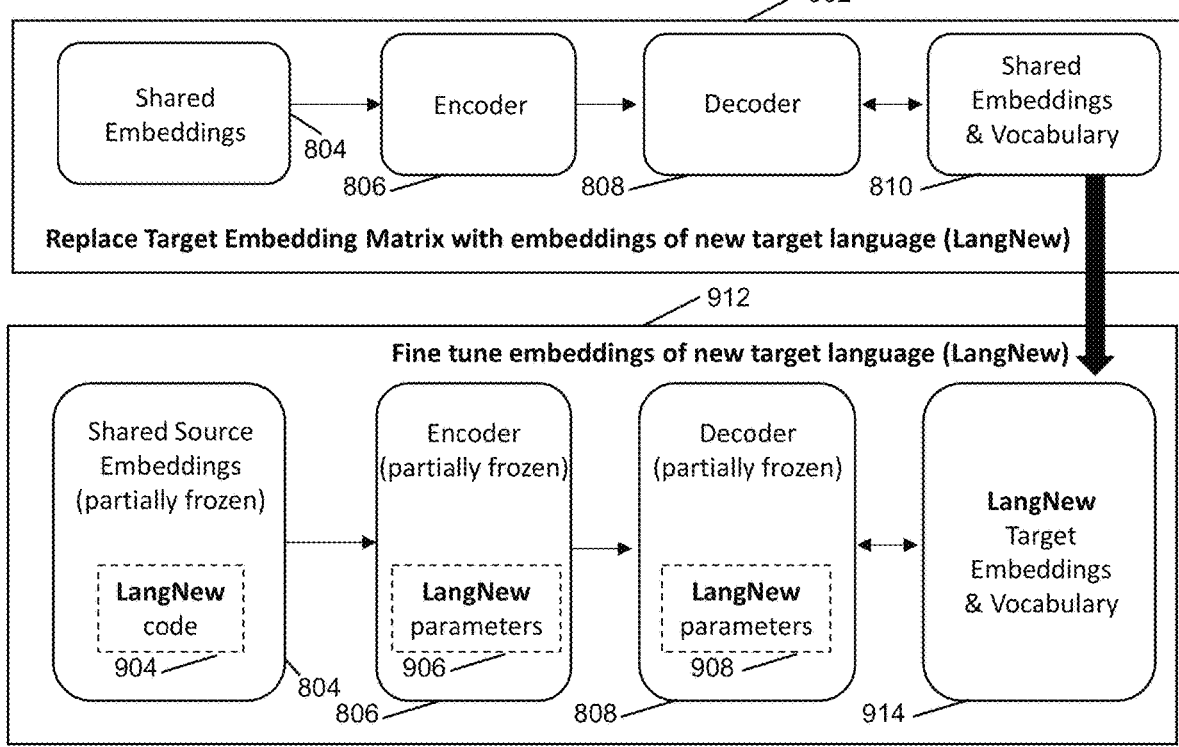
FIG. 9 illustrates a method for adding a new target language with incremental training.

FIG. 8 and FIG. 9 illustrate methods for continual-incremental learning of new languages. The incremental learning methods in FIGS. 8 and 9 for adding a new source and target language, respectively, (i.e., without retraining a trained MNMT system on its existing source and target languages) substitute a shared embedding matrix with a language-specific embedding matrix corresponding to the new source and new target language at 802 and 902, respectively. Then at 812 and 912, respectively and separately, the trained MNMT system is fine tuned to the new source and target language, while freezing the other parameters of the trained MNMT system. In an embodiment when adding a target and/or a source language, additional language-specific components may be trained to improve performance (e.g., encoder adapter layers 135 or decoder adapter layers 139 of the MNMT system 100 shown in FIG. 1). Advantageously, as the parameters of the trained MNMT system are not modified, the performance of the trained MNMT system on the initial set of languages does not degrade.

With specific reference to FIG. 8, source embedding matrix 804 of a trained MNMT system is replaced at 802 with language-specific embedding matrix 814 of the new source language to be added (i.e., LangNew). In the embodiments shown in FIG. 1, this entails replacing the embedding layer 104a with a language-specific embedding layer corresponding to the new language. The source embeddings of the trained MNMT system are fine-tuned at 812 with the language-specific embeddings 814 while totally or partially freezing the parameters of the encoder 806, decoder 808 and shared embeddings of the decoder 810. In an embodiment, the parameters of the encoder 806 and decoder 808 are partially frozen, and LangNew encoder parameters 818 and LangNew decoder parameters 820, respectively, are computed when the LangNew source embeddings 814 are fine-tuned at 812.

In an embodiment, the existing trained model may be the model of the MNMT system 100 trained according to the method in FIG. 5. In an alternate embodiment, the existing trained model may be a many-to-many multilingual model with a shared vocabulary and source-side language codes (to indicate the target language). To add a new source language (i.e., LangNew; e.g., Greek) to the existing trained model, a new (smaller) vocabulary is built for the LangNew language only, and the source embedding matrix of the existing trained model is replaced with a new embedding matrix corresponding to the vocabulary of the LangNew language. For token embeddings that appear in both vocabularies (i.e., a new language and an existing language), the new embeddings for these tokens are initialized with the existing embedding values. In an embodiment for the system 100, the initialized embedding matrix is trained on parallel data of LangNew (e.g., Greek) and an existing language (e.g., English) while freezing all the other parameters. Advantageously, there is no loss in performance in the existing languages of the existing trained model as the original parameters are unmodified (i.e., frozen) during training. At runtime (i.e., inference), to translate from the initial set of languages, the initial shared vocabulary and embeddings are selected, and to translate from a newly added language (i.e., LangNew), the vocabulary and embeddings of that newly added language are selected.

With specific reference to FIG. 9, target embedding matrix 810 of a trained MNMT system is replaced at 902 with language-specific embedding matrix 914 of the new target language to be added (i.e., LangNew). In the embodiments shown in FIG. 1, this entails replacing the embedding layer 104b and the linear layer 186 (i.e., vocabulary projection matrix) with a language-specific embedding layer and a language-specific linear layer corresponding to LangNew. The target embedding layer and the linear layer are referred in FIG. 9 together as "embeddings & vocabulary". The target embeddings & vocabulary 810 of the trained MNMT system are fine-tuned at 912 with the language-specific embeddings & vocabulary 914 while totally or partially freezing the parameters of the encoder 806, decoder 808 and shared embeddings of the encoder 804. In the embodiment the parameters of the encoder 806, decoder 808 and shared embeddings of the encoder 804 are partially frozen, Lang-New encoder parameters 906, LangNew decoder parameters 908, and source LangNew code 904, respectively, are computed when the LangNew target embeddings 914 are fine-tuned at 912. Also, in the embodiment where the embedding layer 104b and the linear layer 186 may be the same layers the language-specific embeddings & vocabulary 914 may be trained at the same time.

In the embodiments shown in FIG. 9, fine-tuning the decoder at 912 is similar to fine-tuning the encoder at 812 with some modifications. The decoder 808 has a target embedding matrix and vocabulary, which are usually tied and shared with the source embedding matrix (i.e., the same parameters are used between the three, which in alternate embodiments they need not be). Accordingly, both the target embeddings and the vocabulary projection matrix are tied and adapted to the new LangNew vocabulary. If the initially trained MNMT system initial model requires an additional language code to translate into LangNew, one is added to the source embedding matrix. During fine tuning at 912, all source embeddings are frozen except for those of LangNew and initialized with the existing language (e.g., English) code embedding of the initially trained MNMT system. This approach may be combined with fine tuning language-specific parameters (e.g., adapter modules or fine-tuned Transformer layers) in the decoder and/or encoder.

In other embodiments of those shown in FIG. 8 and FIG. 9 for fine tuning of language-specific parameters for a LangNew, the newly added language-specific embedding matrix may be combined with other fine-tuned language-specific components in the encoder and/or the decoder to better adapt to a newly added source language or target language. For example, fine tuning of the encoder language-specific parameters 818 and 906 and decoder language-specific parameters 820 and 908 may be performed for adapter layers in the manner described above while freezing all the other layers and adding the newly trained adapter layers with other encoder adapter layers 135 and decoder adapter layers 139. In yet other embodiments of those shown in FIG. 8 and FIG. 9 for fine tuning of language-specific parameters for a LangNew, at runtime various combinations of encoder language-specific parameters 818 and 906 and decoder language-specific parameters 820 and 908 may be bypassed (i.e., omitted at runtime).

Additional disclosure and evaluation that sets forth the effectiveness of language-specific embeddings is disclosed by Berard in "Continual Learning in Multilingual NMT via Language-Specific Embeddings", published on arXiv as 2110.10478, which is incorporated herein by reference.

F. Exemplary System Architecture for the MNMT System

Figure 10:
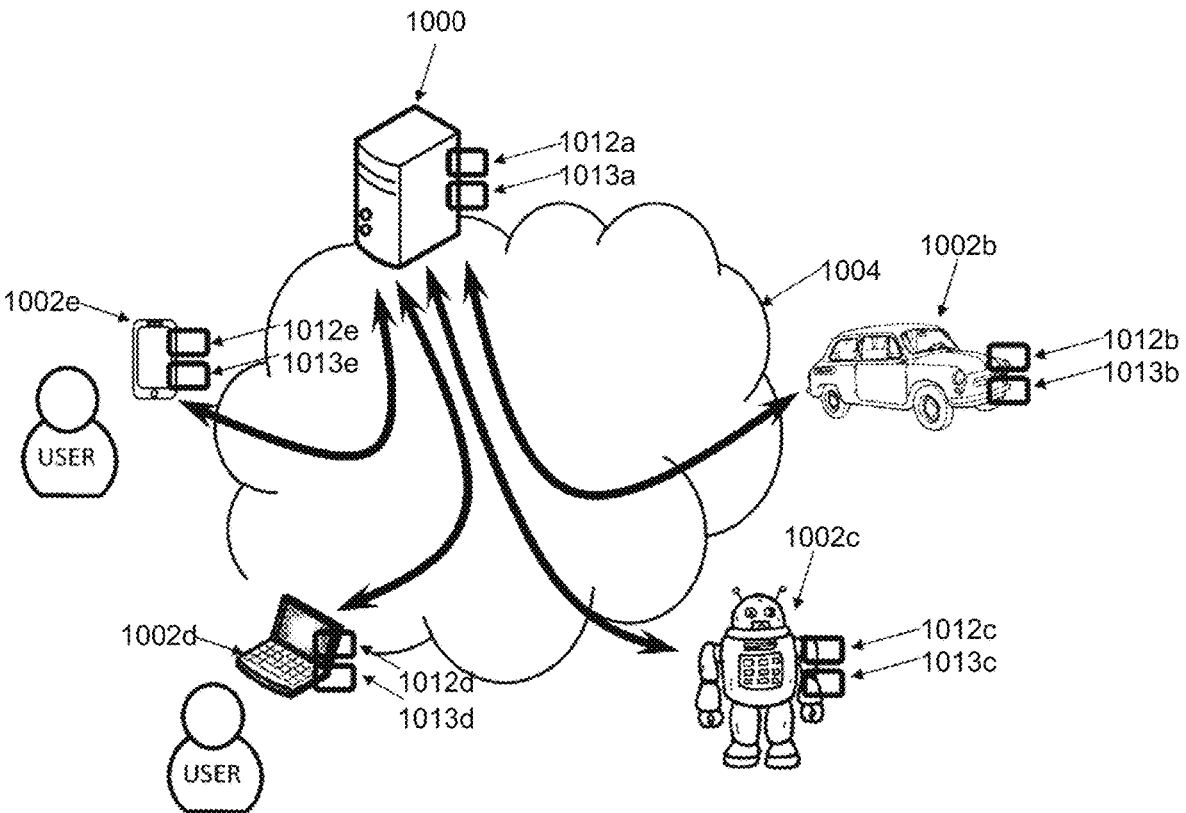
FIG. 10 illustrates an example computing environment in which the disclosed systems and methods may be performed.

The above-mentioned systems, methods and embodiments may be implemented within an architecture such as that illustrated in FIG. 10, which comprises server 1000 and one or more client devices 1002 that communicate over a network 1004 which may be wireless and/or wired, such as the Internet, for data exchange. Server 1000 and the client devices 1002 each include processor 1012 and memory circuit 1013, such as a hard disk. Client devices 1002 may be any devices that communicate with server 1000, including autonomous vehicle 1002b, robot 1002c, computer 1002d, or cell phone 1002e. In an embodiment, the server 1000 may store a trained MNMT system 100 (shown in FIGS. 1 and 2) in memory circuit 1013a and provide translation services to client devices 1002. For example, the server 1000 may provide translation services for cell phone 1002*e* client device with a smartphone app for translation services installed. For example, the smartphone app may, in cooperation with MNMT system 100 stored on memory circuit 1013*a* at server 1000, may provide real time text translation for phrases and words, or real time voice translation to text or audio. In other embodiments, the smartphone app may automatically provide a translation for all content on a web site.

G. Miscellaneous

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described herein may be partially or fully implemented by a special purpose computer created by configuring a general purpose computer to execute one or more particular functions embodied in program code of computer programs. The functional blocks, flowchart components, and other elements described above serve as software specifications, which may be translated into program code of the computer programs by the routine work of a skilled technician or programmer.

The program code of the computer programs include processor-executable instructions that are stored on at least one non-transitory, tangible computer-readable medium. The program code of the computer programs may also include or rely on stored data. The program code of the computer programs may encompass a basic input/output system (BIOS) that interacts with hardware of the special purpose computer, device drivers that interact with particular devices of the special purpose computer, one or more operating systems, user applications, background services, background applications, etc.

The program code of the computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art and are also intended to be encompassed by the following claims.

What is claimed is:

1. A multilingual neural machine translation system comprising at least one processor for translating an input sequence from a source language to a target language, comprising:

an encoder configured for encoding the input sequence in the source language into an encoder representation, wherein the encoder comprises an encoder adapter selector for selecting, from a plurality of encoder adapter layers, an encoder adapter layer corresponding to the source language for processing the encoder representation; and a decoder configured for processing output of the encoder adapter layer to generate a decoder representation, wherein the decoder comprises a decoder adapter selector for selecting, from a plurality of decoder adapter layers, a decoder adapter layer corresponding to the target language for generating a translation of the input sequence in the target language from the decoder representation;

wherein (i) at least one of each encoder adapter layer and each decoder adapter layer corresponding to a language in a set of languages is trained with parallel data of at least one other language in the set of languages, and (ii) at least another one of an encoder adapter layer and a decoder adapter layer corresponding to a language in the set of languages is not trained with parallel data of at least one other language in the set of languages; and wherein the multilingual neural machine translation system is configured to perform zero-shot translation using the encoder representation and the decoder representation that are produced by the encoder adapter layer and the decoder adapter layer, respectively, for the language in the set of languages that is not trained with parallel data of at least one other language in the set of languages.

2. The multilingual neural machine translation system of claim 1, wherein the at least one of each encoder adapter layer and each decoder adapter layer is a monolingual adapter layer implemented by the processor and trained using parallel data for the set of languages.

3. The multilingual neural machine translation system of claim 1, wherein the encoder comprises a plurality of transformer encoder layers forming an encoder pipeline, wherein each transformer encoder layer comprises a respective encoder adapter layer for the source language.

4. The multilingual neural machine translation system of claim 3, wherein the decoder comprises a plurality of transformer decoder layers forming a decoder pipeline, wherein each transformer decoder layer comprises a respective decoder adapter layer for the target language.

5. The multilingual neural machine translation system of claim 1, wherein the encoder and the decoder comprise transformers, and wherein the encoder adapter layer and the decoder adapter layer are adapter layers comprising a feed-forward network with a bottleneck layer.

6. The multilingual neural machine translation system of claim 5, wherein each adapter layer of the plurality of encoder adapter layers and the plurality of decoder adapter layers comprises a residual connection between input of each adapter layer and output of each adapter layer.

7. The multilingual neural machine translation system of claim 1, further comprising:
   a source pre-processing unit, implemented by the processor, with an initial source embedding layer trained on the plurality of languages and one or more language-specific source embedding layers that are each trained on languages that are not one of the plurality of languages; one of the initial source embedding layer and the one or more language-specific source embedding layers being configured to pre-process the input sequence to generate representations for input to the encoder; and
   a target pre-processing unit, implemented by the processor, with an initial target embedding layer trained on the plurality of languages and one or more language-specific target embedding layers that are each trained on the languages that are not one of the plurality of languages; one of the initial target embedding layer and the one or more language-specific target embedding layers being configured to pre-process the input sequence to generate representations for input to the decoder.

8. The multilingual neural machine translation system of claim 7, wherein the encoder and the decoder are configured with language-specific parameters that correspond to the one or more language-specific embedding layers, independent of the parameters that correspond to the plurality of languages.

9. The multilingual neural machine translation system of claim 8, wherein the source pre-processing unit is configured with language codes that are associated with the one or more language-specific target embedding layers, independent of the initial embedding layers that are associated with the plurality of languages.

10. A multilingual neural machine translation method for translating an input sequence from a source language to a target language, comprising:
   storing in a memory an encoder having a plurality of encoder adapter layers and a decoder having a plurality of decoder adapter layers;
   selecting, from the plurality of encoder adapter layers, an encoder adapter layer for the source language;
   processing, using the selected encoder adapter layer corresponding to the source language, the input sequence in the source language to generate an encoder representation;
   selecting, from the plurality of decoder adapter layers, a decoder adapter layer for the target language; and
   processing, using the selected decoder adapter layer corresponding to the target language, the encoder representation to generate a translation of the input sequence in the target language;
   wherein (i) the encoder adapter layers and the decoder adapter layers are trained using parallel data for a set of languages, (ii) at least one of each encoder adapter layer and each decoder adapter layer corresponding to a language in the set of languages is trained with parallel data of at least one other language in the set of languages, and (iii) at least another one of an encoder adapter layer and a decoder adapter layer corresponding to a language in the set of languages is not trained with parallel data of at least one other language in the set of languages; and
   wherein the multilingual neural machine translation system is configured to perform zero-shot translation using the encoder representation and the decoder representation that are produced by the encoder adapter layer and the decoder adapter layer, respectively, for the language in the set of languages that is not trained with parallel data of at least one other language in the set of languages.

11. The multilingual neural machine translation method of claim 10, wherein the at least one of each encoder adapter layer and each decoder adapter layer is a monolingual adapter layer trained using parallel data for the set of languages.

12. The multilingual neural machine translation method of claim 10, wherein the at least one of each encoder adapter layer and each decoder adapter layer is a bilingual adapter layer trained using parallel data for the set of languages.

13. The multilingual neural machine translation method of claim 10, wherein said storing the encoder further comprises storing a plurality of transformer encoder layers forming an encoder pipeline, wherein each transformer encoder layer comprises a respective encoder adapter layer for the source language.

14. The multilingual neural machine translation method of claim 13, wherein said storing the decoder further comprises storing a plurality of transformer decoder layers forming a decoder pipeline, wherein each transformer decoder layer comprises a respective decoder adapter layer for the target language.

15. The multilingual neural machine translation method of claim 10, wherein the encoder and the decoder stored in said memory are transformers.

16. The multilingual neural machine translation method of claim 15, wherein the encoder adapter layer and the decoder adapter layer stored in said memory are adapter layers comprising a feed-forward network with a bottleneck layer.

17. The multilingual neural machine translation method of claim 16, wherein each adapter layer of the plurality of encoder adapter layers and the plurality of decoder adapter layers stored in said memory has a residual connection between input of each adapter layer and output of each adapter layer.

18. The multilingual neural machine translation method of claim 10, further comprising:

storing in the memory a source pre-processing unit with an initial source embedding layer trained on the plurality of languages and one or more language-specific source embedding layers that are each trained on languages that are not one of the plurality of languages;

selecting one from the initial source embedding layer and the one or more language-specific source embedding layers to pre-process the input sequence in the source language to generate representations for input to the encoder;

storing in the memory a target pre-processing unit with an initial target embedding layer trained on the plurality of languages and one or more language-specific target embedding layers that are each trained on the languages that are not one of the plurality of languages; and selecting one from the initial target embedding layer and the one or more language-specific target embedding layers to pre-process the input sequence to generate representations for input to the decoder.

19. The multilingual neural machine translation method of claim 18, further comprising:

storing in the memory language-specific parameters for the encoder or the decoder that correspond to the one or more language-specific embedding layers, independent of parameters stored in the memory that correspond to the plurality of languages, wherein said selecting the source embedding layer for the source language selects the language-specific parameters for the encoder or decoder when the source language is not one of the plurality of languages; and storing in the memory language-specific parameters for the encoder or the decoder that correspond to the one or more language-specific embedding layers, independent of parameters stored in the memory that correspond to the plurality of languages, wherein said selecting the target embedding layer for the target language selects the language-specific parameters for the encoder or the decoder when the target language is not one of the plurality of languages.

* * * * *